US010632564B2

(12) United States Patent
Azuma et al.

(10) Patent No.: US 10,632,564 B2
(45) Date of Patent: Apr. 28, 2020

(54) VACUUM INSULATION PANEL MANUFACTURING DEVICE

(71) Applicant: NIPPON STEEL NISSHIN CO., LTD., Chiyoda-ku, Tokyo (JP)

(72) Inventors: Tsutomu Azuma, Tokyo (JP); Hirohisa Mishima, Tokyo (JP); Takefumi Nakako, Tokyo (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 0 days.

(21) Appl. No.: 16/308,962

(22) PCT Filed: May 31, 2017

(86) PCT No.: PCT/JP2017/020286
§ 371 (c)(1),
(2) Date: Dec. 11, 2018

(87) PCT Pub. No.: WO2017/217232
PCT Pub. Date: Dec. 21, 2017

(65) Prior Publication Data
US 2019/0247956 A1    Aug. 15, 2019

(30) Foreign Application Priority Data
Jun. 13, 2016  (JP) ................. 2016-117304

(51) Int. Cl.
*B23K 26/00* (2014.01)
*B32B 15/00* (2006.01)
(Continued)

(52) U.S. Cl.
CPC ............ *B23K 26/24* (2013.01); *B23K 26/103* (2013.01); *B23K 26/123* (2013.01);
(Continued)

(58) Field of Classification Search
CPC ........ B23K 26/00; B23K 26/20; B23K 26/24; B32B 15/00; B32B 15/10; B32B 15/14; B32B 37/00; B32B 37/06; B32B 37/065
See application file for complete search history.

(56) References Cited

U.S. PATENT DOCUMENTS

| 4,527,042 A | 7/1985 | Shinohara et al. |
| 6,761,996 B1 | 7/2004 | Kim et al. |
| 2011/0213321 A1 | 9/2011 | Fattman et al. |

FOREIGN PATENT DOCUMENTS

| JP | S63232122 A | 9/1988 |
| JP | H0187030 U | 6/1989 |

(Continued)

OTHER PUBLICATIONS

International Search Report corresponding to Application No. PCT/JP2017/020286; dated Jul. 18, 2017.
(Continued)

*Primary Examiner* — Seyed Masoud Malekzadeh
*Assistant Examiner* — Matthew Hoover
(74) *Attorney, Agent, or Firm* — Cantor Colburn LLP

(57) ABSTRACT

A vacuum insulation panel manufacturing method that makes it possible to manufacture low-cost, high-performance vacuum insulation panels, and a vacuum insulation panel are provided. This method of manufacturing a vacuum insulation panel (1) involves: a stacking step in which a first metal plate (20) is overlaid on one side of a thermally insulating core material (10), and in which a backing member (50) having an opening (51) and a second metal plate (30) having an exhaust port (32) are placed, with the opening (51) and the exhaust port (32) overlapping, overlaid on each other on the other surface of the core member (10) in the order of backing member (50) and second metal plate (30) from the core member (10) side; a first welding step for welding outwards of where the core member (10) is dis- (Continued)

posed in the first metal plate (20) and the second metal plate (30); a vacuum creating step for evacuating air from the exhaust pert (32) to create a vacuum in an inner area which is held between the first metal plate (20) and the second metal plate (30) and in which the core member (10) is arranged; and a laser welding step in which, in a state in which the inner area is made into a vacuum by the vacuum creating step, the exhaust port (32) is sealed by means of a sealing material (60) and the sealing material (60), the second metal plate (30) and the backing member (50) are laser welded.

6 Claims, 7 Drawing Sheets

(51) Int. Cl.
| | | |
|---|---|---|
| *B32B 37/00* | (2006.01) | |
| *B23K 26/24* | (2014.01) | |
| *F16L 59/065* | (2006.01) | |
| *B23K 37/04* | (2006.01) | |
| *B23K 26/28* | (2014.01) | |
| *B23K 26/14* | (2014.01) | |
| *F25D 23/06* | (2006.01) | |
| *B23K 26/20* | (2014.01) | |
| *B23K 26/60* | (2014.01) | |
| *B23K 26/12* | (2014.01) | |
| *B23K 26/32* | (2014.01) | |
| *B23K 26/10* | (2006.01) | |
| *B32B 15/14* | (2006.01) | |
| *B32B 37/06* | (2006.01) | |
| *B23K 101/18* | (2006.01) | |
| *B23K 103/16* | (2006.01) | |

(52) U.S. Cl.
CPC ...... *B23K 26/1224* (2015.10); *B23K 26/1476* (2013.01); *B23K 26/206* (2013.01); *B23K 26/28* (2013.01); *B23K 26/32* (2013.01); *B23K 26/60* (2015.10); *B23K 37/0408* (2013.01); *B23K 37/0443* (2013.01); *B32B 15/14* (2013.01); *B32B 37/065* (2013.01); *F16L 59/065* (2013.01); *F25D 23/06* (2013.01); *B23K 2101/18* (2018.08); *B23K 2103/172* (2018.08); *F25D 2201/14* (2013.01)

(56) References Cited

FOREIGN PATENT DOCUMENTS

| | | |
|---|---|---|
| JP | H0261358 B2 | 12/1990 |
| JP | H04231187 A | 8/1992 |
| JP | 2000149791 A | 5/2000 |
| JP | 2001108184 A | 4/2001 |
| JP | 2001287074 A | 10/2001 |
| JP | 2001311497 A | 11/2001 |
| JP | 2002050711 A | 2/2002 |
| JP | 2002144072 A | 5/2002 |
| JP | 2004205794 A | 7/2004 |
| JP | 2006017165 A | 1/2006 |
| JP | 4365736 B2 | 11/2009 |
| JP | 2010003763 A | 1/2010 |
| JP | 2010255178 A | 11/2010 |
| JP | 2015083281 A | 4/2015 |

OTHER PUBLICATIONS

JPO Notice of Reasons for Rejection corresponding to Application No. 2016-117304; dated Jul. 18, 2017.
Extended European Search Report corresponding to Application No. 17813134.8-1016/3460309 PCT/JP2017020286; dated Jul. 16, 2019.
Extended European Search Report corresponding to Application No. 17813135.5-1016/3460310 PCT/JP2017020290; dated Jul. 19, 2019.
International Search Report issued in International Application No. PCT/JP2017/020290 dated Jul. 18, 2017.
JPO Notice of Reasons for Rejection corresponding to Application No. 2016-117305; dated Jul. 18, 2017.
JPO Notice of Reasons for Rejection corresponding to Application No. 2017-023648; dated Jul. 18, 2017.
USPTO Non-Final Office Action corresponding to U.S. Appl. No. 16/229,233; dated Jul. 26, 2019.

VACUUM INSULATION PANEL MANUFACTURING DEVICE

CROSS REFERENCE TO RELATED APPLICATIONS

This is the U.S. national stage of application No. PCT/JP2017/020286, filed on May 31, 2017. Priority under 35 U.S.C. § 119(a) and 35 U.S.C. § 365(b) is claimed from Japanese Application No. 2016-117304, filed on Jun. 13, 2016, the disclosure of which is also incorporated herein by reference.

TECHNICAL FIELD

The present invention relates to a vacuum insulation panel manufacturing device suitably used for a refrigerator, a cold storage, a hot storage, a heat insulating wall of a house or the like, and so on.

BACKGROUND ART

In recent years, development of energy-saving products and energy-saving techniques is in progress in every industry with regard to electric power shortage and so on. Vacuum insulation panels are products developed as one of energy-saving measures. At present, the panels are widely adopted as a heat insulating material for refrigerators, vending machines, and the like and for heat insulating performance enhancement and electric power consumption reduction. Also in progress is examination for application as a heat insulating material for houses. In general, existing vacuum insulation panels have a structure in which a core member such as glass wool is heat sealed with an aluminum laminate film.

In a vacuum insulation panel heat sealed with an aluminum laminate film, moisture permeation from a heat seal portion results in a decrease in the degree of vacuum, and enclosure with an adsorbent such as activated carbon and zeolite is performed in this regard. Even so, a problem arises as the heat insulating performance is halved in seven to eight years. Desired in this regard is development of a vacuum insulation panel capable of maintaining its heat insulating properties for a long time. Developed as a vacuum insulation panel having long-term heat insulation properties is a vacuum insulation panel that is evacuated inside and has a stainless steel-based end portion welded in a state where a core member such as glass wool is wrapped with a thin metal plate such as a stainless steel plate.

Patent Document 1 discloses a device for manufacturing such vacuum insulation panels. In the device, a heat insulating material is arranged in the space that is formed by an inner plate body and an outer plate body provided with an evacuation port, a laminated body is prepared in which the peripheral edge portions of the outer and inner plate bodies are welded, a sealing member is placed on the wax that is arranged around the evacuation port, the laminated body is arranged in a chamber, vacuum suctioning is performed from the evacuation port by a vacuum suction unit, the wax is melted by heating of the laminated body, and the evacuation port is sealed by the sealing member.

Patent Document 1: Japanese Patent No. 4365736

DISCLOSURE OF THE INVENTION

Problems to be Solved by the Invention

In the manufacturing device disclosed in Patent Document 1, evacuation and brazing are performed in the chamber. Accordingly, the chamber is required into which the entire laminated body of the outer and inner plate bodies and the heat insulating material is put. In addition, a heating unit in the chamber is required since brazing is performed in the chamber. As a result, the size of the vacuum insulation panel manufacturing device increases to entail costs.

An object of the present invention is to provide a miniaturizable vacuum insulation panel manufacturing device.

Means for Solving the Problems

In the vacuum insulation panel manufacturing device according to the present invention, a vacuum insulation panel is manufactured by wrapping an insulating core member with a packaging member in which an evacuation port is provided, applying a vacuum to evacuate inside of the packaging member from the evacuation port, and sealing the evacuation port with a sealing member. The vacuum insulation panel manufacturing device includes a chamber with an opened bottom, a chamber evacuation hole provided in the chamber, a quartz glass window unit provided in the top of the chamber, a holding unit which can hold the sealing member, a lifting mechanism which raises/lowers the holding unit, a frame member which holds and raises/lowers the chamber, and a laser welding unit provided outside of the chamber.

The holding unit may include a magnet and be capable of holding the sealing member as a magnetic body by using a magnetic force on an evacuation port side surface of the holding unit.

The holding unit may be capable of pressing the sealing member to a region covering the evacuation port of the packaging member.

A seal member may be attached to an outer periphery of the opening of the chamber.

A laser emitting unit of the laser welding unit may be rotatable around an axis.

Effects of the Invention

According to the present invention, a miniaturizable vacuum insulation panel manufacturing device can be provided.

PREFERRED MODE FOR CARRYING OUT THE INVENTION

Figure 1:
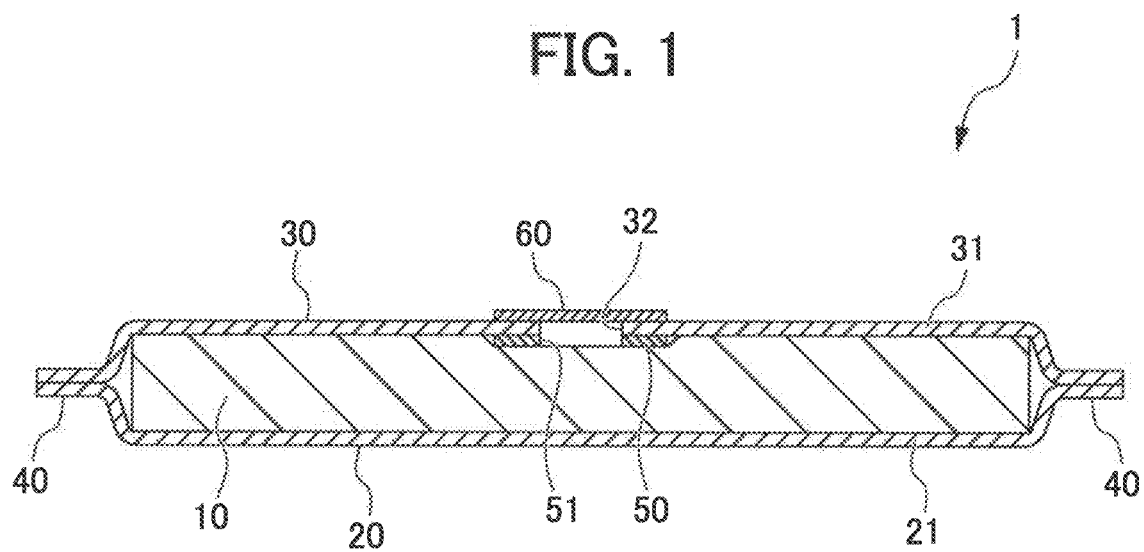
FIG. 1 is a cross-sectional view of a vacuum insulation panel 1.
Figure 2:
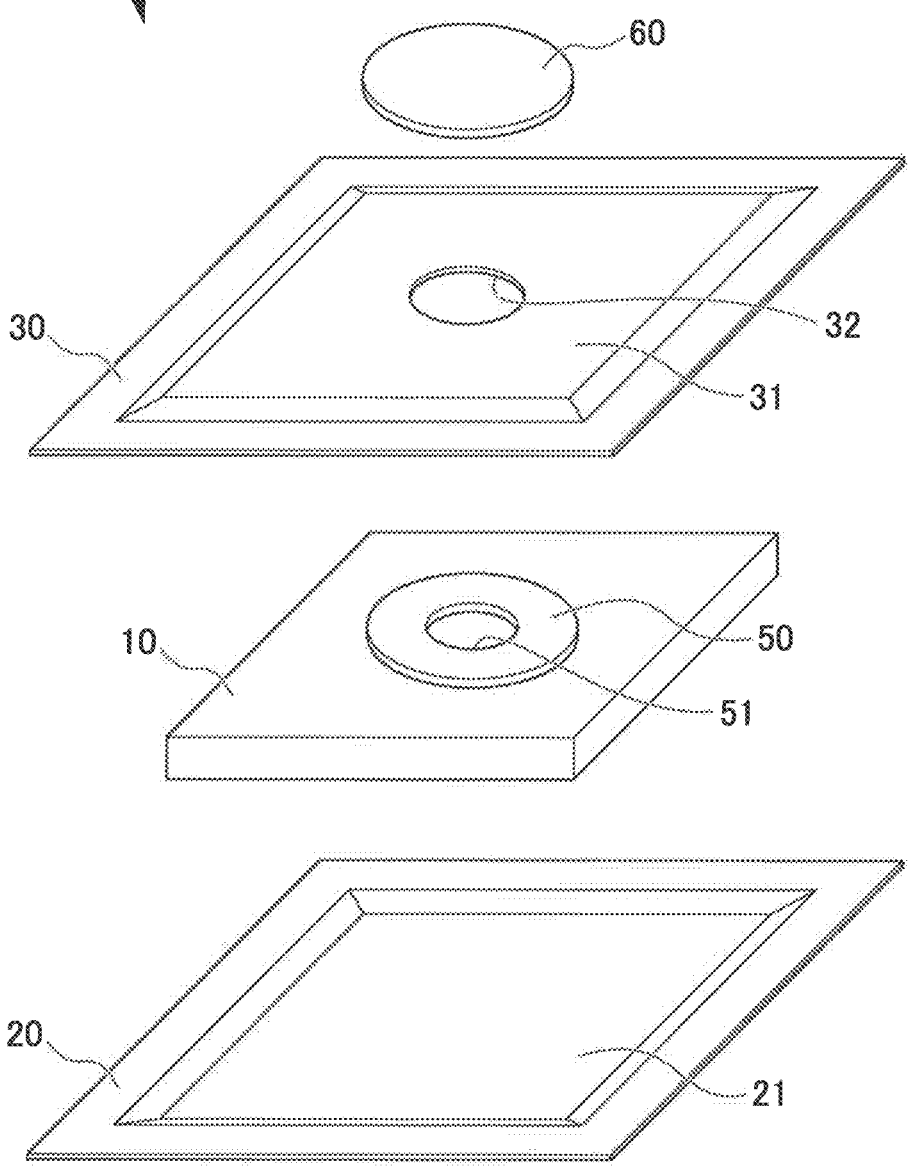
FIG. 2 is an exploded view of the vacuum insulation panel 1.

Hereinafter, a preferred embodiment of the present invention will be described with reference to accompanying drawings. FIG. 1 is a cross-sectional view of a vacuum insulation panel 1 manufactured by a vacuum insulation panel manufacturing device 2 of the present invention. FIG. 2 is an exploded view of the vacuum insulation panel 1.

(Overall Configuration of Vacuum Insulation Panel 1)

The vacuum insulation panel 1 is provided with a core member 10 made of an insulating material and a first metal plate (packaging member) 20 and a second metal plate 30 (packaging member) arranged so as to sandwich the core member 10.

Bulging portions 21 and 31 are provided in the middle portions of the first metal plate 20 and the second metal plate 30. The first metal plate 20 and the second metal plate 30 are stacked in a state where the core member 10 is accommodated in the recessed portion that is on the inner surface sides of the bulging portions 21 and 31.

Peripheral edge portions 40 (four sides) of the stacked first metal plate 20 and second metal plate 30 are seam welded.

An evacuation port 32, which is a circular opening, is provided in the middle of the second metal plate 30. An annular backing member 50 is arranged inside the second metal plate 30 across the evacuation port 32, a circular sealing member 60 is arranged outside the second metal plate 30, and the evacuation port 32 is sealed as a result.

The backing member 50, the second metal plate 30, and the sealing member 60 are laser welded as described later, and the inside of the vacuum insulation panel 1 is maintained in a vacuum state.

(Core Member 10)

The core member 10 is formed by organic fibers such as synthetic fibers and natural fibers or inorganic fibers such as glass fibers and rock wool, which are insulating materials, being laminated so as to have a predetermined thickness.

(Metal Plates 20 and 30)

The first metal plate 20 and the second metal plate 30 are formed in a rectangular shape slightly larger than the core member 10 in plain view and are arranged so as to cover the upper surface and the lower surface of the core member 10.

Although various metal plates such as an aluminum alloy plate and a stainless steel plate can be used as the material of the first metal plate 20 and the second metal plate 30, a stainless steel plate excellent in strength and corrosion resistance is preferably used from the viewpoint of deformation resistance and appearance maintenance over a long period of time.

The thicknesses of the first metal plate 20 and the second metal plate 30 are preferably 0.1 mm to 0.3 mm from the viewpoint of reducing the weight of the vacuum insulation panel 1 while suitably maintaining the vacuum state inside the vacuum insulation panel 1.

(Bulging Portions 21 and 31)

The first metal plate 20 and the second metal plate 30 are provided with the bulging portions 21 and 31 for core member accommodation. The bulging portions 21 and 31 have a shape in which the respective inner surface sides of the first metal plate 20 and the second metal plate 30 are recessed in a shape corresponding to the core member 10 and bulge to the outer surface sides.

(Evacuation Port 32)

The evacuation port 32 is provided in the middle of the bulging portion 31 of the second metal plate 30.

(Backing Member 50)

The backing member 50 has an annular shape, and an opening portion 51 having the same diameter as the evacuation port 32 provided in the second metal plate 30 is provided in the middle of the backing member 50. The sealing member 60 has a disk shape and has the same diameter as the backing member 50. In the embodiment, SUS 430 as a magnetic body is used as the backing member 50 and the sealing member 60. However, the present invention is not limited thereto, and the backing member 50 may be another metal member without having to be limited to the magnetic body and the sealing member 60 may be another magnetic body.

(Vacuum Insulation Panel Manufacturing Device 2)

Figure 3:
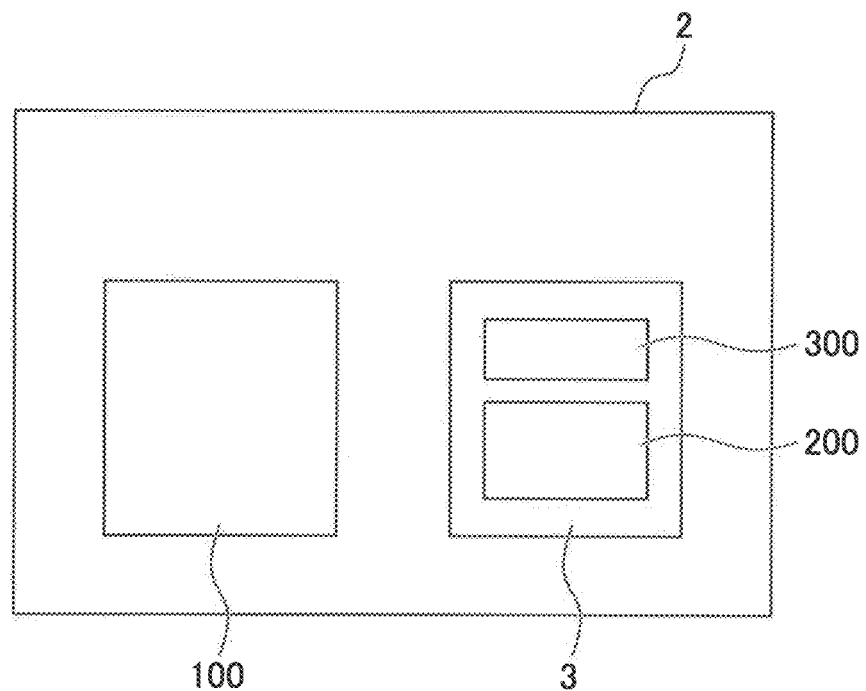
FIG. 3 is a block diagram of a vacuum insulation panel manufacturing device 2 manufacturing the vacuum insulation panel 1.

Next, the vacuum insulation panel manufacturing device 2 of the embodiment for manufacturing the vacuum insulation panel 1 will be described. FIG. 3 is a block diagram of the vacuum insulation panel manufacturing device 2. The vacuum insulation panel manufacturing device 2 is provided with a seam welding device 100 performing a seam welding step on the outer peripheries of the first metal plate 20 and the second metal plate 30 and a vacuum device 3 performing vacuum creation and sealing on the inside of a panel in a state where a vacuum is yet to be created inside with seam welding performed. The vacuum device 3 is provided with a vacuum suction unit 200 and a laser welding unit 300.

(Seam Welding Device 100)

Figure 4:
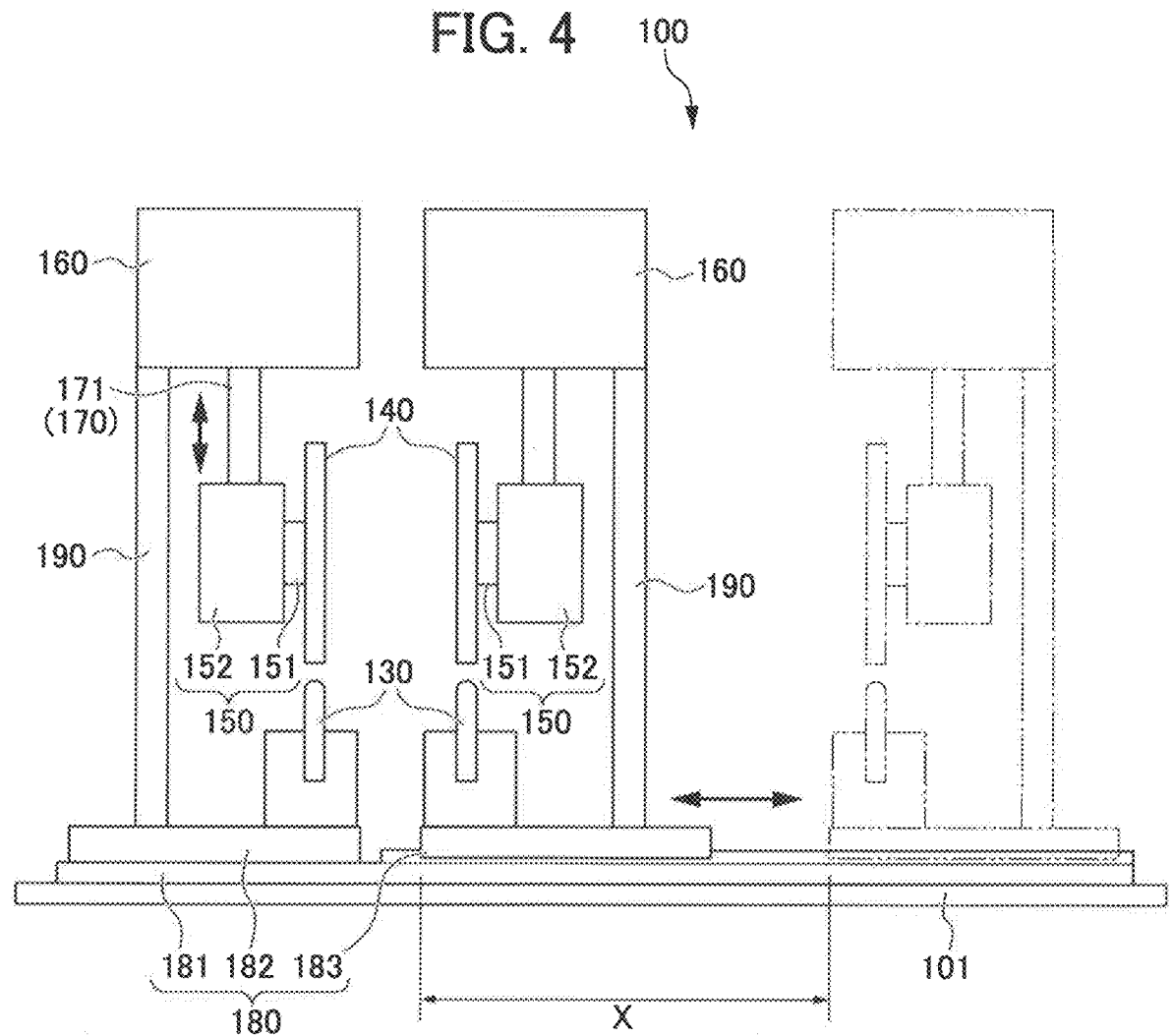
FIG. 4 is a diagram illustrating a seam welding device 100.

The seam welding device 100 will be described first. FIG. 4 is a diagram illustrating the seam welding device 100, and FIG. 5 is a schematic perspective view of the seam welding device 100.

The seam welding device 100 is provided with a plurality of lower electrodes 130, a plurality of upper electrodes 140, a plurality of upper electrode support members 150 supporting the plurality of upper electrodes 140, an upper electrode moving mechanism 160, a first inter-electrode distance variable mechanism 170, and a second inter-electrode distance variable mechanism 180.

In the present embodiment, two lower electrodes 130, two upper electrodes 140, two upper electrode support members 150, two upper electrode moving mechanisms 160, and two first inter-electrode distance variable mechanisms 170 are provided.

Figure 5:
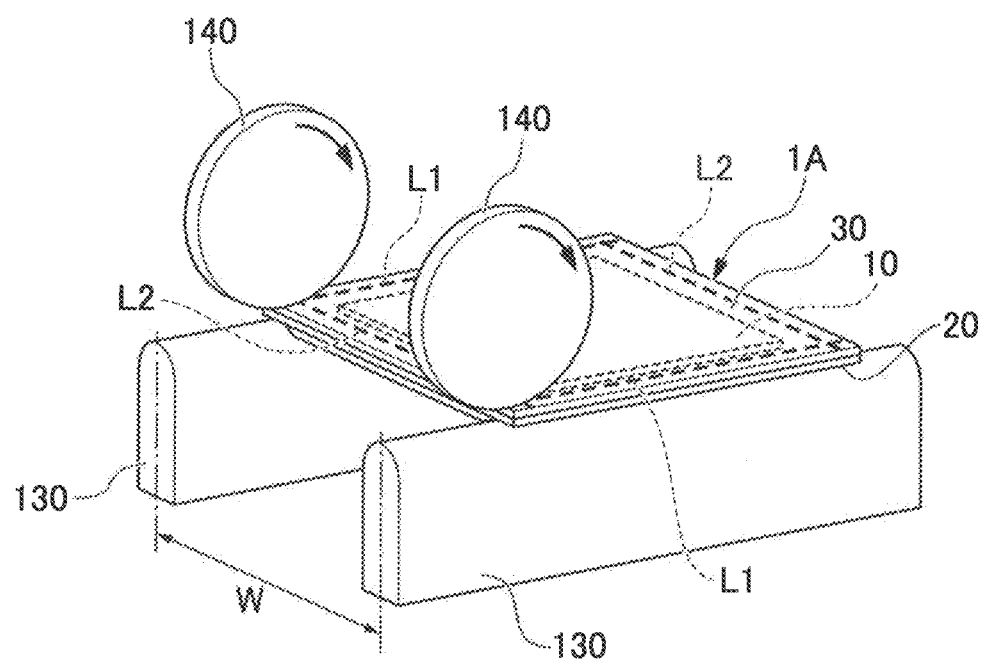
FIG. 5 is a schematic perspective view of the seam welding device 100.

As illustrated in FIG. 4 and FIG. 5, the lower electrode 130 is formed in a rail shape (block shape) and is arranged on a floor surface 101. The plurality of lower electrodes 130 extend in parallel to each other. In the present embodiment, two lower electrodes 130 are arranged. In the present embodiment, the lower electrode 130 is arranged on the floor surface 101 via the second inter-electrode distance variable mechanism 180 (described later) arranged on the floor surface 101.

The upper electrode 140 is arranged above each lower electrode 130. The upper electrode 140 is formed in a disk shape and is arranged such that the circumferential direction (rotation direction) of the disk is along the direction in which the lower electrode 130 extends.

The upper electrode support member 150 rotatably supports the upper electrode 140 in the direction in which the lower electrode 130 extends. In the present embodiment, the upper electrode support member 150 is arranged beside each upper electrode 140 and is provided with a shaft member 151 connected to the rotation center of the upper electrode 140 and extending in the horizontal direction and a main body portion 152 rotatably supporting the shaft member 151.

The upper electrode moving mechanism 160 moves the upper electrode support member 150 in the direction in which the lower electrode 130 extends. The upper electrode moving mechanism 160 includes, for example, a rail member arranged above the upper electrode support member 150, extending in the same direction as the direction in which the lower electrode 130 extends, and supporting the upper electrode support member 150.

The first inter-electrode distance variable mechanism 170 varies the distance between the lower electrode 130 and the upper electrode 140. The first inter-electrode distance variable mechanism 170 includes, for example, a piston rod 171 and a cylinder (not illustrated) advancing and retracting the piston rod 171 upwards and downwards. The lower end side of the piston rod 171 is connected to the upper electrode support member 150 and the upper end side of the piston rod 171 is connected to the upper electrode moving mechanism 160.

The second inter-electrode distance variable mechanism 180 is interposed between the lower electrode 130 and a bottom surface and varies distances W between the plurality of lower electrodes 130 and between the plurality of upper electrodes 140. The second inter-electrode distance variable mechanism 180 is provided with a base 181 installed on the floor surface 101 and a fixed table 182 and a movable table 183 arranged on the upper surface of the base 181.

The base 181 is fixed to the floor surface 101. The fixed table 182 is fixed to the upper surface of the base 181. The movable table 183 is installed so as to be slidable with respect to the base 181.

In the present embodiment, one of the two lower electrodes 130 is fixed to the upper surface of the fixed table 182 and the other is fixed to the upper surface of the movable table 183. In addition, one of the two upper electrode moving mechanisms 160 and one of the two first inter-electrode distance variable mechanisms 170 are fixed to the upper surface of the fixed table 182 via a support frame 190 and the others are fixed to the upper surface of the movable table 183 via the support frame 190.

The movable table 183 slides in a direction X, which is orthogonal to the direction in which the lower electrode 130 extends. As a result, it is possible to change the distance W between the two lower electrodes 130 and the distance W between the two upper electrodes.

(Vacuum Device 3)

Figure 6:
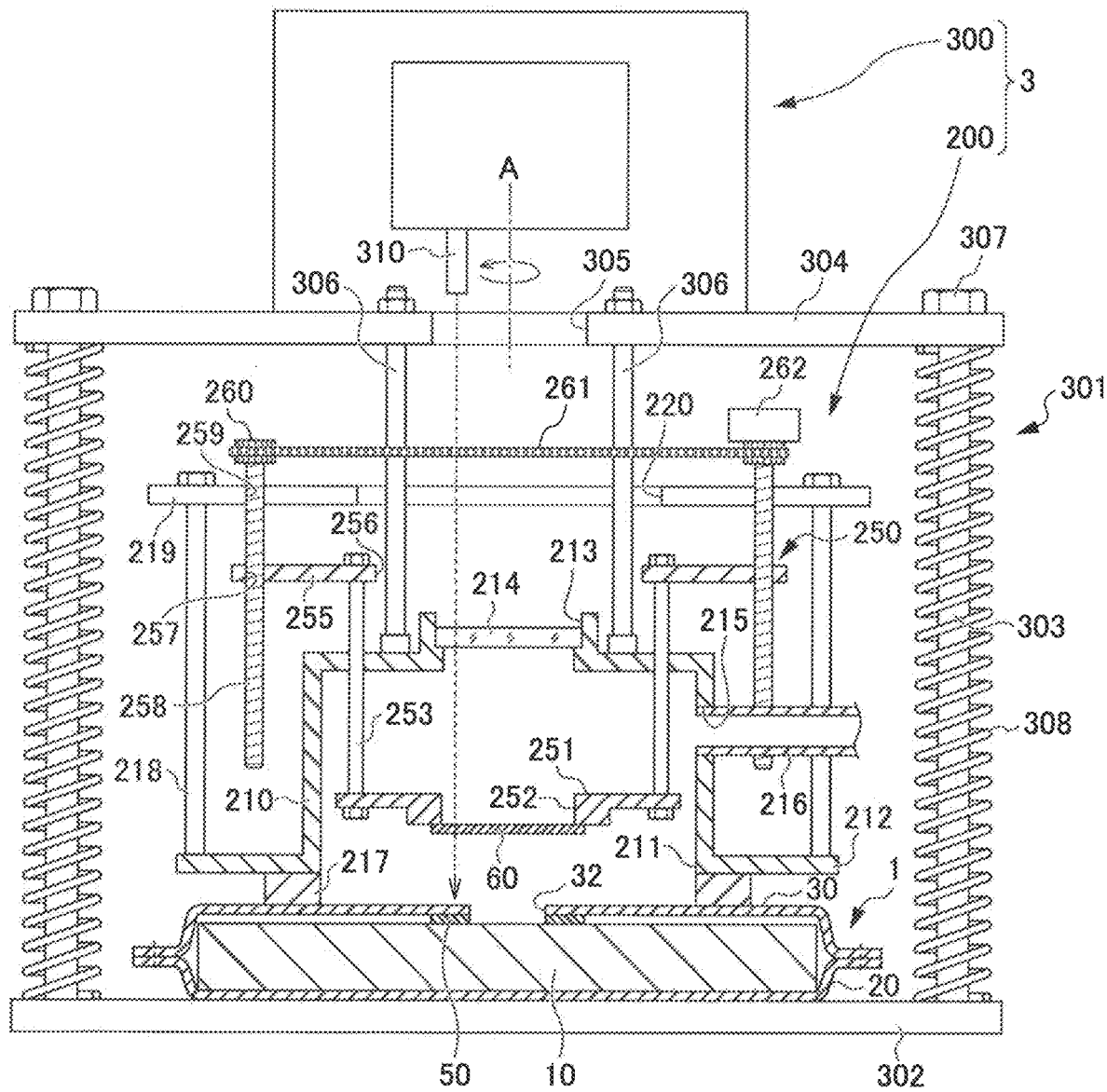
FIG. 6 is a diagram illustrating a vacuum device 3 of the vacuum insulation panel manufacturing device 2.

The vacuum device 3 of the vacuum insulation panel manufacturing device 2 will be described below. FIG. 6 is a diagram illustrating the vacuum device 3 of the vacuum insulation panel manufacturing device 2. The vacuum device 3 is provided with the vacuum suction unit 200 and the laser welding unit 300. In the drawing, a partial cross section is illustrated for easy understanding and the whole is not necessarily illustrated in cross section.

(Vacuum Suction Unit 200)

The vacuum suction unit 200 is provided with a chamber 210 having an open bottom portion and a sealing member lifting mechanism 250 provided in the chamber 210.

(Chamber 210)

The chamber 210 has an open bottom portion (opening portion 211). On the outer periphery of the opening portion 211, a packing 217 is arranged over the entire circumference in the circumferential direction. Sealability is maintained and evacuation is possible by the packing 217 and the surface of the second metal plate 30 being brought into close contact with each other.

A flange portion 212 extending to the outer diameter side is provided on the outer periphery of the bottom portion of the chamber 210. A pillar member 218 extending upwards is fixed to the outer periphery of the flange portion 212. In FIG. 3, two pillar members 218 are attached in bilateral symmetry. In the embodiment, however, the pillar members 218 are attached in three places evenly in the circumferential direction.

The upper end of the pillar member 218 is fixed to an upper plate 219 holding the sealing member lifting mechanism 250. The upper plate 219 is annular and a circular upper plate opening portion 220 is provided in the middle portion of the upper plate 219.

A window 213 is provided in the middle of the upper portion of the chamber 210, and quartz glass 214 is attached to the window 213. A chamber evacuation hole 215 is provided in a side portion of the chamber 210. A pipe 216 is connected to the chamber evacuation hole 215, and a vacuum pump (not illustrated) is connected to the pipe 216.

The sealing member lifting mechanism 250 is provided with a holding plate 251 holding the sealing member 60, a support rod 253 supporting the holding plate 251 at the lower end, a lifting plate 255 to which the upper end of the support rod 253 is fixed, a lifting rod 258 screwed with the lifting plate 255, and a chain gear 260, a chain 261, and a rotary knob 262 rotating the lifting rod.

(Holding Plate 251)

The holding plate 251 has an annular shape with a hole 252 in the middle, and a magnet is attached inside. As described above, the sealing member 60 is made of a magnetic body, and thus the holding plate 251 is capable of holding the sealing member 60 with a magnetic force.

Incidentally, the magnetic force of the holding plate 251 allows a worker to manually attach and detach the sealing member 60 from the holding plate 251 with ease. During sealing of the evacuation port 32 of the second metal plate 30 as described later, the force suctioned by vacuum is stronger than the magnetic force. Once the holding plate 251 is raised in a vacuum-suctioned state, the sealing member 60 is separated from the holding plate 251.

The support rod 253 is attached to the holding plate 251 in three places along the circumference. In FIG. 3, two support rods 253 are attached in bilateral symmetry. In the embodiment, however, the support rods 253 are attached in three places evenly in the circumferential direction. The support rod 253 extends upwards and has an upper end attached to the lifting plate 255.

The support rod 253 is inserted, so as to be movable up and down while maintaining the airtight state of the chamber 210, in three places around the quartz glass 214 on the upper surface of the chamber 210.

(Lifting Plate 255)

The lifting plate 255 has an annular shape with a hole 256 in the middle. A screw hole 257 is provided on the outer periphery side of the place where the support rod 253 supporting the holding plate 251 is fixed.

In FIG. 3, the screw hole 257 is provided in two places in bilateral symmetry. In the embodiment, however, the screw holes 257 are attached in three places evenly in the circumferential direction.

The lifting rod 258 having a threaded outer periphery is screwed into the screw hole 257 of the lifting plate. In FIG. 3, the lifting rod 258 is also provided in two places in bilateral symmetry. In the embodiment, however, the lifting rods 258 are provided in three places evenly in the circumferential direction.

The lifting rod 258 passes through a hole 259 formed in the upper plate 219 and is held so as to be rotatable and so as to be incapable of moving up and down with respect to the upper plate 219.

The chain gear 260 is attached to the upper end of the lifting rod 258. The chain 261 is bridged between the chain gears 260 of the three lifting rods 258. The chain 261 meshes with the gear of the chain gear 260. The rotary knob 262 is attached to the portion of one of the lifting rods 258 that is on the chain gear 260.

(Laser Welding Unit 300)

A frame member 301 is arranged so as to cover the outside of the above-described vacuum suction unit 200. The frame member 301 is provided with a base member 302, a pillar member 303 extending upwards from the outer peripheral portion of the base member 302, and an upper frame portion 304 fixed to the upper end of the pillar member 303. The frame member 301 is fixed with the vacuum suction unit 200 by a connecting rod 306.

By the action of a nut 307 and a spring 308 fixing the upper frame portion 304 and the pillar member 303, the upper frame portion 304 moves up and down when the nut 307 is rotated in the clockwise direction or the counterclockwise direction. Possible as a result are fixing of the vacuum insulation panel 1 before sealing and opening of the vacuum insulation panel 1 after sealing. A circular hole 305 is provided in the middle of the upper frame portion 304. The laser welding unit 300 is arranged on the upper frame portion 304.

The laser welding unit 300 is provided with a laser irradiation unit 310. The laser irradiation unit 310 is rotatable around an axis A of the vacuum device 3. In other words, the laser irradiation unit 310 is movable along a circumference with a predetermined diameter around the axis A.

The upper plate opening portion 220, the window 213, the hole 252, and the quartz glass 214 are arranged around the axis A. The laser light that is emitted from the laser irradiation unit 310 rotatable around the axis A passes through the upper plate opening portion 220, the quartz glass 214, and the hole 252, and then the sealing member 60, the outer peripheral portion of the evacuation port 32 of the second metal plate 30, and the backing member 50 are welded.

Incidentally, the diameters of the upper plate opening portion 220, the window 213, the hole 252, and the quartz glass 214 exceed the diameter of the evacuation port 32 by a certain width and are similar to, for example, the outer diameter of the backing member 50. As a result, the optical path of the laser light is not hindered during laser welding of the sealing member 60, the second metal plate 30, and the backing member 50 as described later.

(Method for Manufacturing Vacuum Insulation Panel 1)

A method for manufacturing the vacuum insulation panel 1 by using the vacuum insulation panel manufacturing device 2 of the embodiment will be described below. FIG. 7 is a diagram illustrating the method for manufacturing the vacuum insulation panel 1 by using the vacuum insulation panel manufacturing device 2.

The method for manufacturing the vacuum insulation panel 1 includes an stacking step, a seam welding step, an evacuating step, a laser welding step, and a cutting step.

(Stacking Step)

Figure 7A:
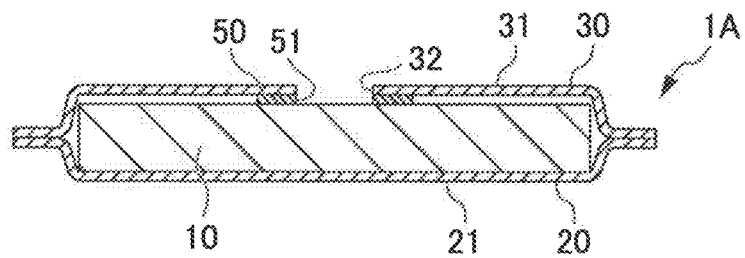
FIG. 7 are diagrams illustrating a method for manufacturing the vacuum insulation panel 1 by using the vacuum insulation panel manufacturing device 2.

FIG. 7A is a diagram illustrating the stacking step. First, the first metal plate 20 in which the bulging portion 21 is formed is arranged such that the bulging portion 21 faces downwards, and the core member 10 is accommodated in the recessed portion of the upper surface of the first metal plate 20.

The backing member 50 is placed on the core member 10. The backing member 50 is arranged so as to be positioned substantially in the middle of the core member 10.

Subsequently, the second metal plate 30 in which the bulging portion 31 is formed is stacked on the first metal plate 20, the core member 10, and the backing member 50 such that the bulging portion 31 faces upwards. A laminated body 1A is formed as a result.

At this time, adjustment is performed such that the opening portion 51 of the backing member 50 and the evacuation port 32 of the second metal plate 30 are aligned.

(Seam Welding Step)

Figure 7B:
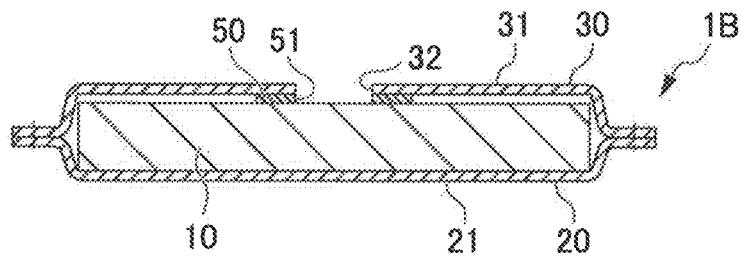

FIG. 7B is a diagram illustrating the seam welding step. In the seam welding step, seam welding is performed on the edge portions (four sides) of the first metal plate 20 and the second metal plate 30 in the laminated body 1A manufactured in the stacking step. The edge portions are parts outside the bulging portions 21 and 31, and the core member 10 is not included in the edge portions. This seam welding step is performed in the atmosphere.

The seam welding is performed by the seam welding device 100 illustrated in FIG. 4 and FIG. 5.

First, the laminated body 1A manufactured in the stacking step is set in the seam welding device 100.

Specifically, the movable table 183 in FIG. 4 is slid until the distance between the two lower electrodes 130 matches the distance between two sides L1 (illustrated in FIG. 5) to be seam welded.

Then, the laminated body 1A is arranged such that the two sides L1 to be seam welded are positioned on the upper surface of the lower electrode 130.

Then, the two sides L1 are seam welded by the seam welding device 100.

Specifically, first, the two upper electrodes 140 are lowered by the first inter-electrode distance variable mechanism 170 and the first metal plate 20 and the second metal plate 30 are sandwiched between the upper electrodes 140 and the lower electrodes 130.

The first metal plate 20 and the second metal plate 30 are seam welded while the upper electrode moving mechanism 160 simultaneously rotates and moves the two upper electrodes 140 in the direction in which the lower electrode 130 extends.

As a result, the two facing sides L1 of the first metal plate 20 and the second metal plate 30 are seam welded at the same time.

Next, the seam welding device 100 seam welds two sides L2, which are orthogonal to the side L1, similarly to the above L1. At this time, the welding line of the side L1 and the welding line of the side L2 are allowed to intersect.

As a result, the two facing sides L1 of the first metal plate 20 and the second metal plate 30 and the facing sides L2 orthogonal to the sides L1 are seam welded.

As a result of the above seam welding step, a panel 1B that is not evacuated inside is manufactured.

(Evacuating Step)

Figure 7C:
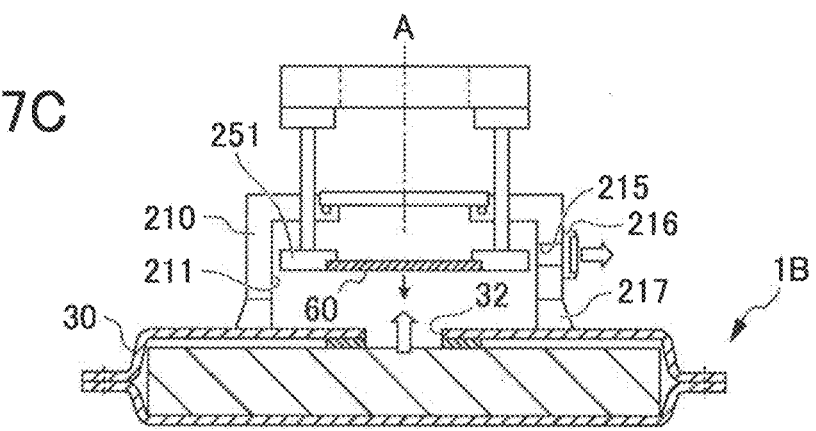

FIG. 7C is a diagram illustrating the evacuating step.

First, the sealing member 60 is mounted on the holding plate 251. At this time, the holding plate 251 is positioned above the opening portion 211 of the chamber 210. In addition, the center of the sealing member 60 is allowed to come to the axis A. At this time, the sealing member 60, which is made of a magnetic body, can be easily attached and detached by the magnetic force of the holding plate 251.

The panel 1B resulting from the seam welding step and not evacuated inside is arranged under the chamber 210 on the base member 302 of the frame member 301. Then, fixing is performed by means of the frame member 301 and tightening of the nut 307. At this time, the center of the evacuation port 32 of the panel 1B is set so as to be on the axis A of the device, and fixing is performed such that the panel 1B is pressed down with uniformity.

At this time, sealability with respect to the upper surface of the second metal plate 30 of the panel 1B is excellent as the packing 217 is attached to the bottom portion of the chamber 210.

The vacuum pump (not illustrated) that is connected to the chamber evacuation hole 215 of the chamber 210 is operated. Evacuation is performed to the target vacuum degree in the chamber 210 or less.

Incidentally, when the evacuation is performed, the sealing member 60 may be allowed to approach the evacuation port 32 by being temporarily lowered and the evacuation may be initiated in that state. At the beginning of the evacuation, turbulence may occur and the glass wool or the like of the core member 10 may be scattered. In the initial stage of the evacuation that may entail turbulence as described above, the sealing member 60 and the evacuation port 32 are allowed to be in proximity to each other in terms of distance, and thus airflow stabilization is achieved and the possibility of such content scattering and the like is reduced. After the airflow is stabilized, the sealing member 60 is raised so as not to hinder the evacuation.

From the viewpoint of preventing glass wool scattering attributable to turbulence, the distance between the evacuation port 32 and the sealing member 60 at the beginning of the evacuation is preferably 0.5 mm to 3.0 mm.

Figure 7D:
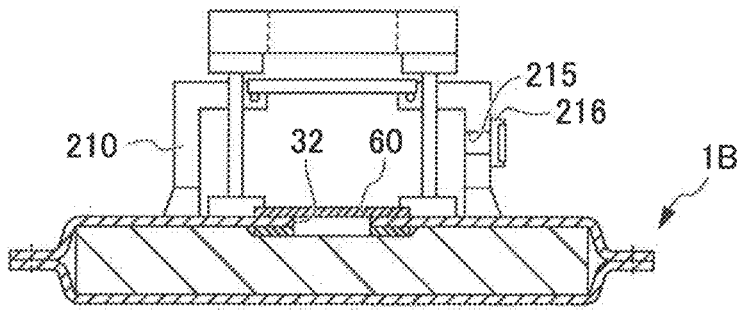
Figure 7E:
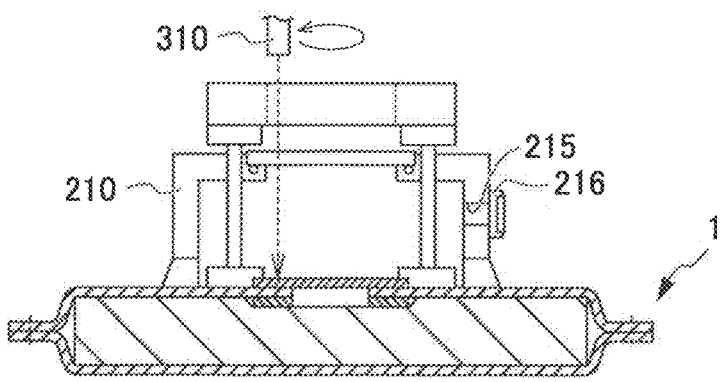

After the target vacuum degree is reached, the sealing member 60 is lowered and the evacuation port 32 is blocked as illustrated in FIG. 7D. Here, the lowering of the sealing member 60 is performed as follows.

The rotary knob 262 illustrated in FIG. 6 is rotated. Then, the chain 261 transmits a rotational force, and each of the chain gears 260 rotates. Once the chain gears 260 rotate, the lifting rods 258 connected to the chain gears 260 rotate as well, and the lifting plate 255 screwed with the screw portions of the lifting rods 258 moves up and down. Once the lifting plate 255 is lowered, the support rod 253 supported by the lifting plate 255 and the holding plate 251 supported by the lower end of the support rod 253 are lowered, and the sealing member 60 held by the holding plate 251 is lowered as well.

The sealing member 60 is lowered in this manner and pressed toward the evacuation port 32 side. As a result of this pressing, the second metal plate 30 is sandwiched between the backing member 50 inserted in the panel 1B and the lowered sealing member 60. Accordingly, the part where the lowered sealing member 60, the second metal plate 30, and the backing member 50 are stacked in three sheets is restrained without a gap.

(Laser Welding Step)

Subsequently, the laser irradiation unit 310 of the laser welding unit 300 emits laser to the part where the sealing member 60, the second metal plate 30, and the backing member 50 are stacked in three sheets. The laser emission is performed over the entire circumference around the evacuation port 32 by the laser irradiation unit 310 being rotated.

Here, the backing member 50 is arranged besides the lowered sealing member 60 and the second metal plate 30. The second metal plate 30 is thin. Accordingly, there is a possibility of melting down in a case where only the sealing member 60 and the second metal plate 30 are used during the laser welding. In the present embodiment, however, the possibility of melting down is low since the backing member 50 is arranged as well.

The part where the sealing member 60, the second metal plate 30, and the backing member 50 are stacked in three sheets is circumferentially welded by the laser light emitted by the laser irradiation unit 310, and thus the internal space in which the core member 10 sandwiched by the first metal plate 20 and the second metal plate 30 is arranged can be completely sealed. The vacuum insulation panel 1 is completed as a result.

The vacuum is released after the part where the lowered sealing member 60, the second metal plate 30, and the backing member 50 are stacked in three sheets is laser welded. The holding plate 251 is raised by the rotary knob 262 being rotated in the direction that is opposite to the lowering direction.

(Cutting Step)

In the cutting step, the vacuum insulation panel 1 is removed from the vacuum device 3, by the nut 307 of the frame member 301 being loosened, with the internal space sealed through the laser welding step. Then, the surplus part in the outer peripheral portion of the vacuum insulation panel 1 is cut and the vacuum insulation panel 1 is completed.

EXAMPLES

Under the following conditions, the vacuum insulation panel 1 was actually manufactured by means of the vacuum insulation panel manufacturing device 2.

As the core member 10, a glass wool with a basis weight of approximately 1,200 g/m$^2$ was used and an object was used that has a dimension capable of filling the inner surface side of the bulging portion to be described later without gaps when the first metal plate 20 and the second metal plate 30 are stacked.

A steel plate of SUS 304 was used as the first metal plate 20 and the second metal plate 30. The dimensions are 220 mm×220 mm×0.1 mm. Then, the bulging portions 21 and 31 of 190 mm×190 mm×5.0 mm were produced by press molding in the first metal plate 20 and the second metal plate 30, respectively.

The evacuation port 32 in the middle of the bulging portion 31 of the second metal plate 30 has a diameter of 20 mm.

SUS 430 as a magnetic body was used for the backing member 50 and the sealing member 60. The dimensions are 0.3 mm in thickness and 40 mm in outer diameter dimension. The opening portion 51 of the backing member 50 has a diameter of 20 mm as in the case of the evacuation port 32 provided in the second metal plate 30.

A single phase AC-type device was used as the seam welding device 100. The upper electrode, which is 100 mm in diameter and 4 mm in thickness, has a disk shape with a flat electrode tip portion. The lower electrode has a block shape and has a thickness of 4 mm, a height of 50 mm, a length of 250 mm, and an electrode tip portion curvature of 20 R. The welding conditions are an applied pressure of 250 N, a welding speed of 1 m/min, a welding current of 1.6 kA, and an energization time ON/OFF ratio of 3 ms/2 ms.

The outer diameter of the opening portion 211 of the chamber 210 is approximately 220 mm, and the packing 217 is a silicone rubber packing with a thickness of 20 mm.

Used as the quartz glass 214 was a circular quartz glass with an outer diameter of 40 mm through which a laser beam with a wavelength of 1 μm is capable of passing.

A fiber laser welding machine manufactured by IPG was used as the laser welding unit 300, and the welding conditions are a welding speed of 10 m/min, an output of 700 W, a laser spot diameter of ϕ 0.2 mm, and pulse-type laser oscillation.

Under the above conditions, the vacuum insulation panel 1 was manufactured and its performance was evaluated.

In evaluating the performance of the vacuum insulation panel 1, a thermal conductivity measuring device (model: FOX200) manufactured by EKO Instruments Co., Ltd. was used for thermal conductivity measurement and evaluation under a condition that the middle portion of the vacuum insulation panel 1 has an average temperature of 25° C.

Three units of the vacuum insulation panel 1 were produced as prototypes under the same conditions and thermal conductivity measurement was carried out. As a result, the thermal conductivity of every sample was within a range of 2.5 to 3.0 mW/m·K, and it was confirmed that trial production of the stainless steel-based vacuum insulation panel 1 excellent in heat insulation performance and heat resistance is possible.

Effects (1) Since the vacuum insulation panel manufacturing device 2 of the embodiment is provided with the laser welding unit 300, the evacuation port 32 can be sealed with the sealing member 60 by laser.

The laser welding does not require heating of a welding spot such as brazing, and irradiation can be performed from the outside of the chamber 210 through the quartz glass 214. Accordingly, a heating unit or the like does not have to be arranged in the chamber 210. The chamber 210 can be reduced in size, and the manufacturing cost of the vacuum insulation panel 1 can be reduced.

In a case where the laser welding is performed, the backing member 50 is arranged inside the part of the evacuation port 32 of the second metal plate 30. Accordingly, the possibility of melting down attributable to laser welding is low, and laser welding to the part where the backing member 50 is arranged becomes possible. Therefore, sealing by the sealing member 60 using the laser welding of the evacuation port 32 becomes possible.

(2) Since the chamber 210 can be reduced in size as described above, it is possible to achieve a compact shape in which arrangement is performed so as to cover a part of the panel 1B that includes the evacuation port 32. As a result, evacuation can be facilitated and can be completed with little effort, and cost reduction can be achieved along with a shorter operation time.

(3) Since the holding unit 251 which can hold the sealing member 60 and the lifting mechanism 250 which can raise/lower the holding unit 251 are provided, it is possible to lower the sealing member 60 and press the sealing member 60 to the evacuation port 32 side. Accordingly, the second metal plate 30 can be sandwiched between the backing member 50 inserted in the panel 1B and the lowered sealing member 60. As a result, the part where the lowered sealing member 60, the second metal plate 30, and the backing member 50 are stacked in three sheets can be restrained without any gap, and sealing by subsequent laser irradiation is possible.

(5) Since the holding plate 251 includes a magnet, the sealing member 60 made of a magnetic body is attached and detached with ease.

(6) The laser irradiation unit 310 is rotatable around the axis A. In other words, circular welding can be performed on the outer periphery of the evacuation port 32 since the laser irradiation unit 310 moves along a circumference that has a predetermined diameter around the axis A.

(7) Since the packing (seal member) 217 is attached to the bottom portion of the chamber 210, sealability with respect to the upper surface of the second metal plate 30 of the panel 1B is excellent.

EXPLANATION OF REFERENCE NUMERALS

1 VACUUM INSULATION PANEL
2 VACUUM INSULATION PANEL MANUFACTURING DEVICE
3 VACUUM DEVICE
10 CORE MEMBER
20 FIRST METAL PLATE
20 METAL PLATE
21 BULGING PORTION
30 SECOND METAL PLATE
30 METAL PLATE
31 BULGING PORTION
32 EVACUATION PORT
50 BACKING MEMBER
60 SEALING MEMBER
100 SEAM WELDING DEVICE
200 VACUUM SUCTION UNIT
210 CHAMBER
211 OPENING PORTION
214 QUARTZ GLASS
217 PACKING
250 SEALING MEMBER LIFTING MECHANISM
251 HOLDING PLATE
255 LIFTING PLATE
300 LASER WELDING UNIT

The invention claimed is:

1. A vacuum insulation panel manufacturing device in which a vacuum insulation panel is manufactured by wrapping an insulating core member with a packaging member in which an evacuation port is provided, applying a vacuum to evacuate inside of the packaging member from the evacuation port, and sealing the evacuation port with a sealing member, the vacuum insulation panel manufacturing device comprising:
   a chamber with an opened bottom;
   a chamber evacuation hole provided in the chamber;
   a quartz glass window unit provided in a top of the chamber;
   a holding plate structured to hold an outer periphery of the sealing member, the holding unit including a hole for allowing laser light to pass through;
   a lifter structured to raise and lower the holding unit;
   a frame structured to hold, raise, and lower the chamber; and
   a laser welder provided outside of the chamber.

2. The vacuum insulation panel manufacturing device according to claim 1, wherein
   the holding plate comprises a magnet and is structured to hold the sealing member as a magnetic body by using a magnetic force on an evacuation port side surface of the holding plate.

3. The vacuum insulation panel manufacturing device according to claim 1, wherein
   the holding plate is structured, in a state of holding an outer periphery of the sealing member to lower the sealing member, block the evacuation port by way of the sealing member and press the sealing member toward the evacuation port side, and
   the laser welding unit laser is structured to weld the sealing member and the packaging member, in a state in which a stacked portion between the sealing member and the packaging member is restrained without any gap.

4. The vacuum insulation panel manufacturing device according to claim 1, wherein a seal member is attached to an outer periphery of an opening of the chamber.

5. The vacuum insulation panel manufacturing device according to claim 1, wherein
a laser emitter of the laser welder is rotatable around an axis.

6. The vacuum insulation panel manufacturing device according to claim 1,
wherein the holding plate is supported by way of a support rod attached in three places along an outer periphery, and
wherein an upper end of the support rod is fixed to the lifter, passing through an outer periphery of a portion where a window is provided to an upper middle portion of the chamber, in which quartz glass is attached to the window.

* * * * *